United States Patent
Wilkes et al.

(10) Patent No.: US 8,695,751 B2
(45) Date of Patent: Apr. 15, 2014

(54) GEARBOX ASSEMBLY FOR AN ELECTRIC POWER STEERING SYSTEM

(75) Inventors: Mark Anthony Wilkes, Birmingham (GB); Michael Appleyard, Cheltenham (GB); Michael James Walsh, Oldbury (GB)

(73) Assignee: TRW Automotives US LLC, Livonia, MI (US)

( * ) Notice: Subject to any disclaimer, the term of this patent is extended or adjusted under 35 U.S.C. 154(b) by 373 days.

(21) Appl. No.: 12/992,366

(22) PCT Filed: May 14, 2009

(86) PCT No.: PCT/IB2009/052017
§ 371 (c)(1), (2), (4) Date: Feb. 16, 2011

(87) PCT Pub. No.: WO2009/138963
PCT Pub. Date: Nov. 19, 2009

(65) Prior Publication Data
US 2011/0155499 A1      Jun. 30, 2011

(30) Foreign Application Priority Data
May 15, 2008    (GB) .................................. 0808795.9

(51) Int. Cl.
*B62D 3/04*    (2006.01)
*B62D 5/04*    (2006.01)

(52) U.S. Cl.
USPC ............................... 180/444; 74/425; 74/440

(58) Field of Classification Search
USPC ....... 180/444, 443; 74/440, 427, 425, 388 PS
See application file for complete search history.

(56) References Cited

U.S. PATENT DOCUMENTS

| | | | | |
|---|---|---|---|---|
| 6,491,131 | B1 * | 12/2002 | Appleyard | 180/444 |
| 6,769,507 | B2 * | 8/2004 | Murakami et al. | 180/444 |
| 7,721,616 | B2 * | 5/2010 | Augustine et al. | 74/352 |
| 7,748,492 | B2 * | 7/2010 | Iwasa et al. | 180/444 |

FOREIGN PATENT DOCUMENTS

| | | | |
|---|---|---|---|
| JP | 2000127985 A | 5/2000 |
| JP | 2001163228 A | 6/2001 |
| JP | 2004330878 A | 11/2004 |

* cited by examiner

*Primary Examiner* — Anne Marie Boehler
(74) *Attorney, Agent, or Firm* — MacMillan, Sobanski & Todd, LLC

(57) ABSTRACT

A gearbox assembly for all electric power steering apparatus comprises an input shaft which carries a worm gear and is supported relative to the housing at one end by a first bearing assembly and at the other by a second bearing assembly, an output shaft which carries a wheel gear which is fixed relative to a housing and which meshes with a worm gear on the input shaft, and a spring assembly which acts between the housing and the first bearing assembly, and the spring assembly applying a biasing force onto the second bearing in a first direction away from the neutral position so as to ensure that the worm and wheel are fully engaged. The spring assembly has a spring rate which has a step change about the neutral position such that the rate of change in the force exerted by the spring assembly on the second bearing assembly as the spring moves in the first direction from its neutral position is lower than the rate of change in the force as the spring moves in the second direction away from the neutral position.

14 Claims, 7 Drawing Sheets

GEARBOX ASSEMBLY FOR AN ELECTRIC POWER STEERING SYSTEM

CROSS-REFERENCE TO RELATED APPLICATIONS

This application is a national stage of International Application No. PCT/IB2009/052017 filed May 14, 2009, the disclosures of which are incorporated herein by reference in entirety, and which claimed priority to Great Britain Patent Application No. 0808795.9 filed May 15, 2008, the disclosures of which are incorporated herein by reference in entirety.

BACKGROUND OF THE INVENTION

This invention relates to improvement in gear assemblies, and in particular to power assisted steering assemblies which incorporate a worm and wheel gear assembly for transferring torque from an electric motor to a steering column or output shaft operatively connected thereto.

It is known to provide a power steering system for a vehicle comprising an electric motor having a stator and a rotor, an input shaft operatively connected to the rotor and adapted to rotate therewith, an output shaft associated with a steering column, and a gearbox adapted to transfer torque from the input shaft to the output shaft in response to a measure of torque in the output shaft produced by a torque sensor. The motor is typically operated to apply an increasing torque to the output shaft as the measured torque increases, thus applying an assistance torque which helps to steer the vehicle.

Steering systems which use a worm and wheel gearbox to transfer torque from the input shaft to the output shaft (the worm usually provided on the input shaft and the wheel on the output shaft) are well known in the art. One problem with these systems is rattle between the worm and wheel which is especially noticeable to the driver when driving on rough roads or when the steering wheel is swayed from side to side under low load. If the worm and wheel teeth are not fully meshed at all times, noise may be produced which may be heard by the driver. This incorrect meshing may arise due to manufacturing tolerances, thermal changes in dimensions, distortion due to torsional loads and wear during service. Various attempts have been made to overcome this problem. For example, a resilient biasing means in the form of an L-shaped leaf spring may be provided which acts between the housing and a support bearing means which supports the end of the worm shaft furthest from the motor. The L-shaped spring applies a light biasing load to the bearing means to keep the worm and wheel engaged.

BRIEF SUMMARY OF THE INVENTION

According to a first aspect the invention provides a gearbox assembly for an electric power steering apparatus comprising: an electric power assisted steering system comprising a housing, an electric motor fixed relative to the housing having a stator and a rotor, an input shaft operatively connected to the rotor, an output shaft operatively connected to a steering column, and a torque sensor adapted to produce an output signal indicative of the torque in the output shaft, the motor being adapted to apply a torque to the output shaft dependent upon the output signal from the torque sensor, and in which the worm gear provided on the input shaft is adapted to mesh with a wheel gear on the output shaft, and a first bearing means is provided which supports the input shaft relative to the housing at its end distal from the motor, further comprising resilient biasing means adapted to act upon the first bearing means to bias the input shaft towards the wheel gear;
a housing;
an input shaft which carries a worm gear and is supported relative to the housing at one end by a first bearing assembly and at the other by a second bearing assembly,
an output shaft which carries a wheel gear which is fixed relative to the housing and which meshes with the worm gear on the input shaft, and
a spring assembly which acts between the housing and the first bearing assembly,
in which in a neutral position the worm and wheel are fully engaged and the spring assembly applies a biasing force onto the second bearing in a first direction away from the neutral position so as to ensure that the worm and wheel are fully engaged, the spring assembly also providing a resisting force against movement of the second bearing in a second direction, opposed to the first direction, in the event that the worm and wheel try to disengage,
wherein the spring assembly has a spring rate which has a step change about the neutral position such that the rate of change in the force exerted by the spring assembly on the second bearing assembly as the spring moves in the first direction from its neutral position is lower than the rate of change in the force as the spring moves in the second direction away from the neutral position.

The invention therefore provides a biasing spring assembly which pushes the worm and wheel together with a near constant force that varies little as the worm and wheel wears due to the relatively low spring rate over that range and which provides a much higher force resisting any attempt by the worm and wheel to separate due to a relatively higher spring rate for movement in the second direction. Therefore, greater gear wheel torque is needed to cause a given amount of space (backlash) to appear between the non torque-transmitting (i.e. non-contacting) flanks of the worm and gear teeth. Consequently, a higher level of torque oscillation (e.g. from road-induced disturbances) is required to produce audible repeated tooth-impact noises (i.e. rattle).

The rate of change in the first direction from the installation position is preferably chosen so that over the expected range of movement in the first direction due to wear the spring force is substantially constant. It may therefore have a spring rate in the first direction away from the neutral position chosen so that a force of around 10-13 Nm is applied to the bearing, and most preferably 11 or 12 Nm. The type, shape and size of the spring assembly may also be chosen to provide a nearly constant force on the bearing for movement in the first direction from the neutral position. Any movement of this kind is usually due to eccentricity of the worm or wheel or wear of the teeth or bearings over time.

For the movement in the second direction the spring rate after the step change it is preferably much higher so that the spring assembly strongly resists any such movement. It may have a spring rate in the second direction away from neutral of at least double that before the step change, for example of between 20 Nm and 26 Nm or perhaps at least three times. The outwards deflection stiffness of the spring after the step change is in effect much greater than before which resists the worm leaving the wheel.

The spring assembly may comprise a flat spring (sometimes called a leaf spring or cantilever spring) which has a first end fixed to the housing and a second end which has a tip that acts upon the first bearing means. The spring is therefore cantilevered out from the end fixed to the housing and applies a force to the bearing if it is slightly bent when in the neutral position. The tip may extend at right angles to the free end of the spring.

If the length of the spring from tip to the point where it is fastened to the housing is several multiples of the amount of movement needed of the bearing the spring will provide a near constant biasing force to the bearing as it moves towards the gear wheel due to wear.

There may be a step change in spring rate that occurs upon movement of the spring assembly through the neutral position, or occurs at a point slightly offset in the second direction from the neutral position. The spring rate may then change more gradually either side of the step change, being lower on one side than the other.

The position of the step change may be adjustable. A mechanism for permitting adjustment of the position during manufacture or post manufacture may therefore be included.

To provide the higher spring rate for movement in the second direction away from neutral and to provide the step change in spring rate, an abutment which functions as a fulcrum may be provided which contacts the leaf spring between the point where it is fixed to the housing and the tip of the spring. As the spring is moved in the second direction towards and then past the neutral position the leaf arm will contact the abutment. This effectively means that only a much shorter length of arm is available to bend giving the effect of a shorter leaf spring with a naturally higher spring rate. The use of a fulcrum is especially suitable for the generation of a step change in spring rate with a simple leaf spring.

The abutment or fulcrum may just touch the leaf spring in the neutral position so that any movement in the second direction away from neutral is at the higher spring rate.

Alternatively, the fulcrum may be spaced slightly from the leaf spring in the neutral position. This allows a small amount of movement in the second direction at the lower spring rate associated with movement in the first direction away from neutral before the higher spring rate comes in to play. This may be useful in allowing for a small amount of movement of the bearing in the second direction away from the neutral position due to eccentricity in the bearing or shaft or worm or misalignment of parts to be accommodated with a constant (or nearly constant) biasing force.

The fulcrum may be substantially rigid so that it does not move or deform when the leaf spring presses against it. Alternatively the fulcrum may be resilient so that it compresses when pressed by the leaf spring. This gives a secondary spring force which may allow more fine tailoring of the spring rate for movement in the second direction away from the neutral position.

The abutment may contact the L-shaped spring at a point approximately midway along the length of the arm that is fixed to the housing (i.e. midway between the fixing point to the housing and the bend in the spring). It may contact the spring closer to the fixed end than this or closer to the bend. For example, it may be located one third along from the fixed end or free end. Placing the fulcrum closer to the bend may produce a much greater spring rate for movement in the second direction away from the neutral position compared with a placement closer to the fixed end.

The abutment may comprise a part of the housing, or a rigid or semi-rigid part secured to the housing. It may be secured to the housing by the same fastenings that secure the leaf spring.

The abutment may comprise a part of an end cap that covers the bearing means and the end of the input shaft furthest from the motor.

The abutment may comprise a U-shaped bar that has a central portion that straddles the leaf spring and two arms that engage holes in the housing. At least one arm may be secured in the hole by glue or a grub screw or some other suitable fastening.

The abutment may contact the leaf spring in the neutral position or may be spaced from it. Where the abutment is rigid, a resilient spacer may be located between the resilient abutment and the leaf spring which contacts both. This may, for example, be added once the leaf spring has been set to the neutral position.

The position of the abutment relative to the housing, and also relative to the leaf spring, may be adjustable. This allows the leaf spring to be set to give the desired bias to the bearing during manufacture and the abutment to be positioned accurately relative to the leaf spring. In this way the position of the step change in spring rate can be adjusted and accurately controlled.

Thus according to a second aspect the invention provides a method of assembly of a gearbox assembly of the first aspect which includes an abutment and a leaf spring comprising the steps of:

setting the neutral position of the leaf spring to apply a predetermined bias to the bearing means and subsequently setting the position of the abutment relative to the leaf spring.

The method may comprise setting the abutment to lightly contact the leaf spring in the neutral position.

The method may include a step of bedding down the assembly prior to setting the abutment by rotating the input shaft through multiple revolutions.

The method may comprise adding a spacer of resilient material between a fixed abutment and the leaf spring once the leaf spring has been set to the neutral position. This allows an abutment that comprises a rigid portion fixed relative to the housing to be extended by the spacer to contact the leaf spring during manufacture. The further the leaf spring is from the fixed portion, the wider the spacer that is to be added.

The method may comprise adding a spacer in a molten or semi-liquid form and then cooling or otherwise hardening the spacer material.

It will be appreciated that other spring assemblies could be used which do not rely on leaf springs. A leaf spring is preferred because it is almost flat, apart from the tip that projects into the housing which makes packaging of the gearbox assembly easier where space constraints exist.

Other advantages of this invention will become apparent to those skilled in the art from the following detailed description of the preferred embodiments, when read in light of the accompanying drawings.

BRIEF DESCRIPTION OF THE DRAWINGS

FIG. 5 (*a*) is a cross sectional view similar to that of FIG. 1 of a first embodiment of a gearbox assembly in accordance with the present invention, (*b*) is a part view in direction A, (*c*) is a part view in direction A with the cover removed, and (*d*) and (*e*) are views of the cover only;

DETAILED DESCRIPTION OF THE INVENTION

Figure 1:
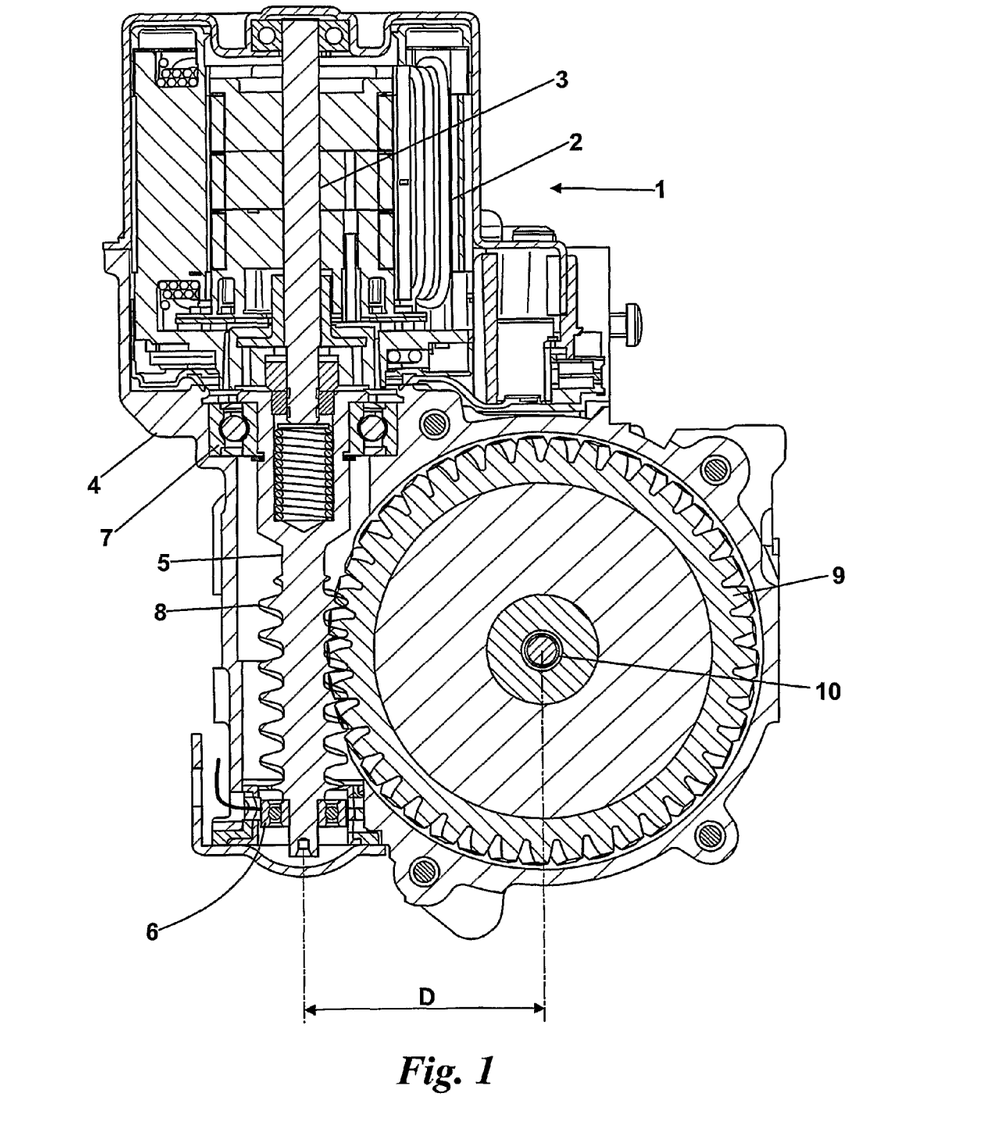
FIG. 1 is a cross sectional view of an electric power assisted steering assembly including a gearbox assembly.

As shown in FIG. 1 of the accompanying drawings a motor 1 for applying assistance torque to an output shaft 10 operatively connected to a steering column shaft comprises a stator 2 and a rotor 3. The motor is mounted onto a side of a housing 4. One end of an input shaft 5 which is splined to an end of the rotor extends through an opening into an inner cavity of the housing. The other end of the input shaft passes through an opening on an opposite side of the housing to the opening, and a first bearing means 6 and second bearing means 7 is located in the opening and opening respectively support the input shaft relative to the housing.

The input shaft 5 carries a worm gear 8 between the two bearing means which is adapted to engage with a toothed wheel 9 provided on the output shaft 10 where it passes through the housing. Bearings (not shown) support the output shaft 10 relative to the housing 4 orthogonal to the axis of the input shaft 5 so that the worm gear and wheel gear are meshed.

In use, an output from a torque sensor (not shown) adapted to measure the torque in the output shaft 10 (or a steering shaft operatively connected thereto) is passed to an electronic control unit (ECU) in turn to produce a motor drive signal which controls the torque produced by the motor 1. The motor 1 then transfers torque through the motor rotor 3 to the input shaft 5 and onto the output shaft 10 to provide assistance to aid a driver of the vehicle.

Each of the bearing means 6, 7 comprises a ball bearing or roller bearing cartridge having an inner bearing race which co-operates with the input shaft and an outer bearing race spaced around the inner race, bearings being provided therebetween. Any well known bearing assembly can be used subject to meeting the requirements for tolerance and load bearing set out by the designer.

The second bearing means 7 is secured to the housing 4 and acts as a pivot about which the input shaft 5 may tilt. It prevents substantially all radial movement of the shaft 5 as it passes through the bearing.

Figure 2:
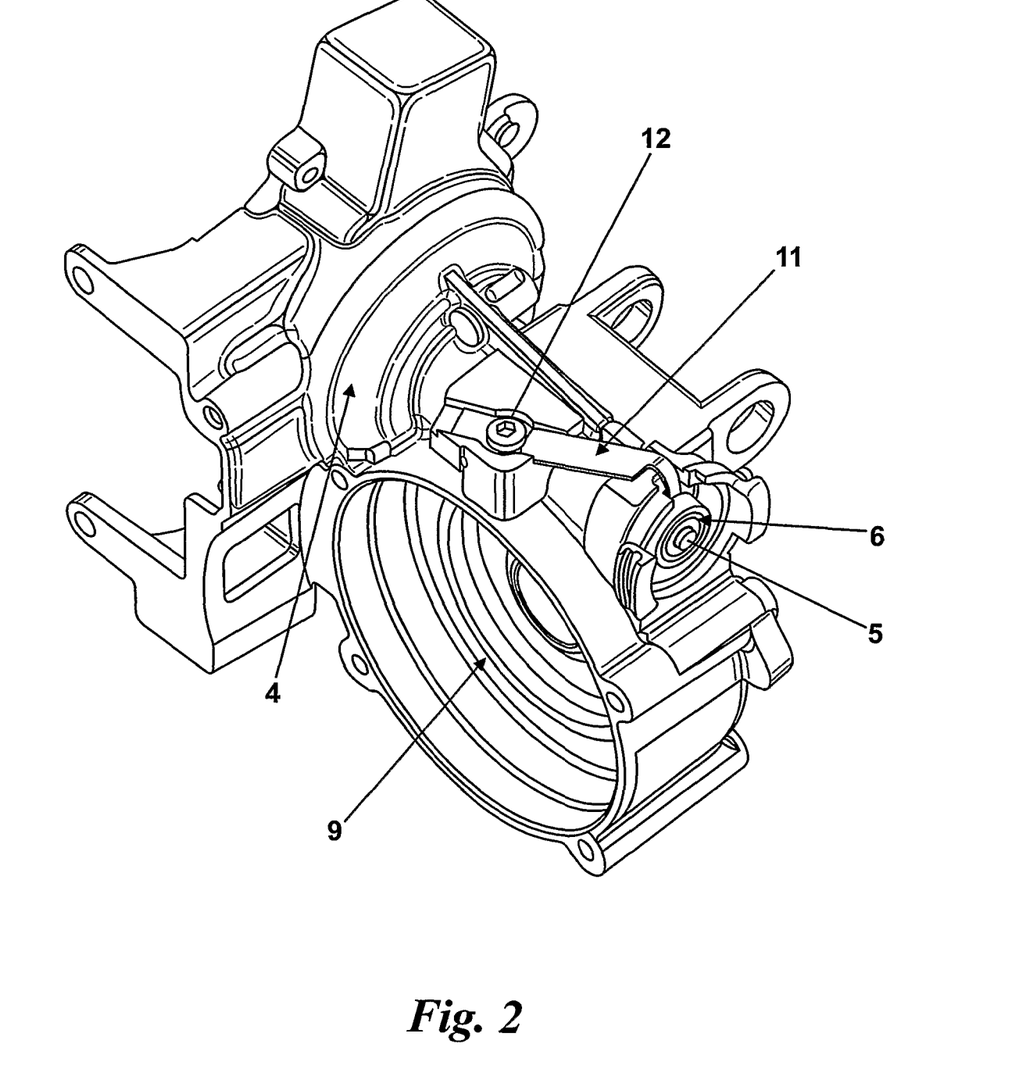
FIG. 2 is an isometric view of the gearbox housing fitted with a leaf spring and input shaft and output shaft.

The first bearing assembly 6 is constrained axially relative to the housing 4 (as described hereinafter) but is free to move radially against the biasing force applied by a biasing means 11 in the form of a leaf spring. The leaf spring is L shaped and has a long arm attached to the housing by bolts or screws 12 at one end and a second arm which extends at right angles to the first to define a tip which bears against the bearing of the first bearing assembly 6. This can be seen clearly in FIG. 2 of the accompanying drawings.

Figure 3:
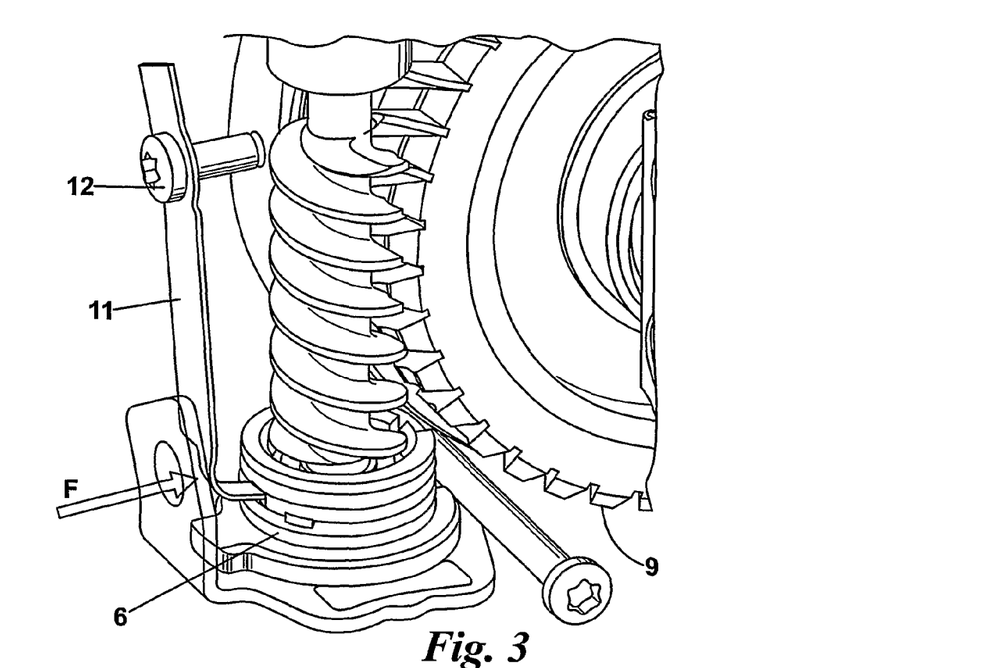
FIG. 3 is a partially cut-away isometric view of the gearbox housing of FIG. 1.

The biasing means 11, which is in effect a bent beam or cantilever, acts to bias the worm into mesh with the gearwheel and to allow it to adopt a fully meshed condition (i.e. where there is no clearance between the flanks on either sides of the engaging worm and gearwheel teeth) for the range of gearwheel size and position variations (due to manufacturing tolerances), temperatures and states of tooth wear. It applies a biasing force in a first direction towards the gear wheel as shown in FIG. 3 of the accompanying drawings. The amount of force depends on how much the leaf spring is bent.

It is required to maintain this fully meshed condition for a range of torque values, measured at the gear wheel, (for example up to 4 N-m in one application) in order to prevent gear rattle when driving around the straight ahead on rough roads. A force of 20N needs to be applied to the worm, radially with respect to the gearwheel in order to maintain full meshing at 4 N-m gearwheel torque. When a higher torque is applied, then the worm will move away from the gearwheel and clearance will occur at the sides of the teeth which are not transmitting the torque. The maximum torque rating of the gear system shown in FIG. 1 is 42 N-m.

Experiments have shown that the range of dimensional backlash variation due to tolerances, temperature and wear that may arise, if a biasing means was not incorporated, is typically around 0.3 mm. To compensate for this, a range of radial displacements of the worm, relative to the gearwheel, is needed which is approximately 2× the backlash variation (because of the 14 degree pressure angle); i.e. 0.6 mm total (or +/−0.3 mm from the nominal worm axis position). This range of displacements is provided by allowing the wormshaft to pivot around the larger ball bearing, nominally moving in a vertical plane, and to bias the movement towards the gearwheel by means of the leaf spring 11 acting on the outer race of the smaller ball bearing.

In the particular design shown in FIG. 1 the ratio of the lengths from the engaging centre of the worm to the centres of the respective bearings means that a force of 20×48/[48+38.5] N (=11N) should be applied by the leaf spring.

The opening in the housing which is provided to accommodate the first bearing means may be lined by a resilient bush to avoid the noise of metal-to-metal impact.

An absolute limit of travel is provided (for example 0.500 mm from the nominal axis) by virtue of the fact that the bore in the bush for the 22 mm diameter bearing is made substantially oval with a dimension along the first and second direction axis of 23 mm. The dimension of the bush bore along an axis at right angles to the first and second direction is nominally 22 mm to prevent unwanted movement of the bearing along the said right angle axis.

Note that it is important to limit the meshing force which occurs at the lower torques because it induces a significant amount of quiescent friction into the operation of the gearbox and this is detrimental form efficiency and good road feel. A meshing force of 20 N will create 0.4 N of friction as measured at the gearwheel. The maximum acceptable is typically around 0.5 N.

To enable it to act as a pivot centre for the wormshaft, at least over the small angular displacements involved (approximately +/−0.33 degrees), the second bearing can be specified as a "C3" clearance grade (i.e. with the maximum standard clearance choice). This will allow the bearing to run with the required misalignment without excessive friction and wear. To prevent it from rattling due to the sporadic gearbox torque reversals that occur when driving straight ahead on rough roads, the second bearing may be axially pre-loaded at approximately 100N. The pre-load can be applied via the shaft by biasing the input shaft away from the motor shaft by means of a compressed multi-wave spring 16.

The connection between the wormshaft 5 and the motor rotor 3 may be via a resilient toothed coupling disc or spider at 70 which engages with cooperating teeth formed respectively in the adjacent ends of the motor shaft and the input shaft. This arrangement permits a small amount of bending compliance between the wormshaft and the motor rotor and hence allows the desired displacement of the wormshaft.

During manufacturing, the gearbox is assembled complete with the biasing spring 11 and "run-in" in the normal way (see FIG. 3). The said running-in process may consist of forcing the gearbox shafts to rotate for several revolutions while simultaneously applying an excessive meshing load to the worm shaft bearing 6, possible via the tip of the spring 11 as indicated by arrow F in FIG. 3.

Figure 4:
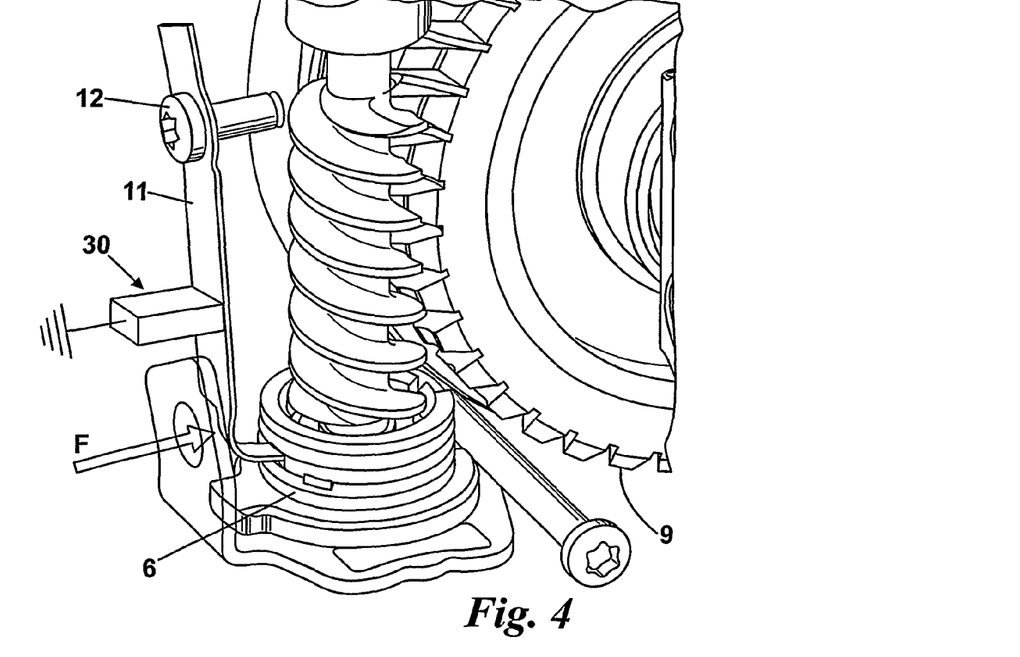
FIG. 4 is a similar partially cut-away isometric view of gearbox housing in accordance with present invention which provides a step change in spring rate for the leaf spring.

As shown in FIG. 4, on completion of the aforesaid procedures a physical abutment 30 is moved into light contact with the biasing leaf spring at some preferred position which is between, but distal from, the end where the spring is fixed to the gearbox housing 4 and the end where it contacts the bearing 6. The abutment is then fixed (grounded) to the gearbox housing.

The effect of the abutment 30 is to significantly increase the outward deflection stiffness of the spring 11 when the worm is attempting to separate from the gearwheel producing a step change in spring rate of the leaf spring as it comes into contact with the abutment. Note that it is the pressure angle (i.e. slope) of the tooth flanks (sides) which creates the said separating action when torque applied to the gearbox. Therefore, due to the abutment 30, greater gear wheel torque is needed to cause a given amount of space (backlash) to appear between the non torque-transmitting (i.e. non-contacting) flanks of the worm and gear teeth. Consequently, a higher level of torque oscillation (e.g. from road-induced disturbances) is required to produce audible repeated tooth-impact noises (i.e. rattle). The inward stiffness of the spring—its first spring rate—remains unaltered by the abutment.

It is important that, when the position of the abutment is set (note: this should take place with zero gearbox torque), there is only very light contact between it and the biasing spring. If there is heavy contact, the quiescent friction of the gearbox will be increased due additional force being imposed on the bearing 6 by the tip of the biasing spring 11. Conversely, any clearance between the abutment and the spring will reduce the potential for rattle reduction.

Note that, because it can be adjusted from sample-to-sample, the final position of the abutment relative to the gearbox housing can be precisely set to ensure the required functionality is achieved without it being affected by the cumulative dimensional tolerances within the assembly. Note that the functionality of the biasing spring 11, having a relatively low spring rate when first installed, is also not significantly affected by the cumulative dimensional tolerances within the assembly either.

Several alternative arrangements of a gearbox employing such an abutment to give a spring assembly with a step change in spring rate follow:

First Embodiment

Figure 5:
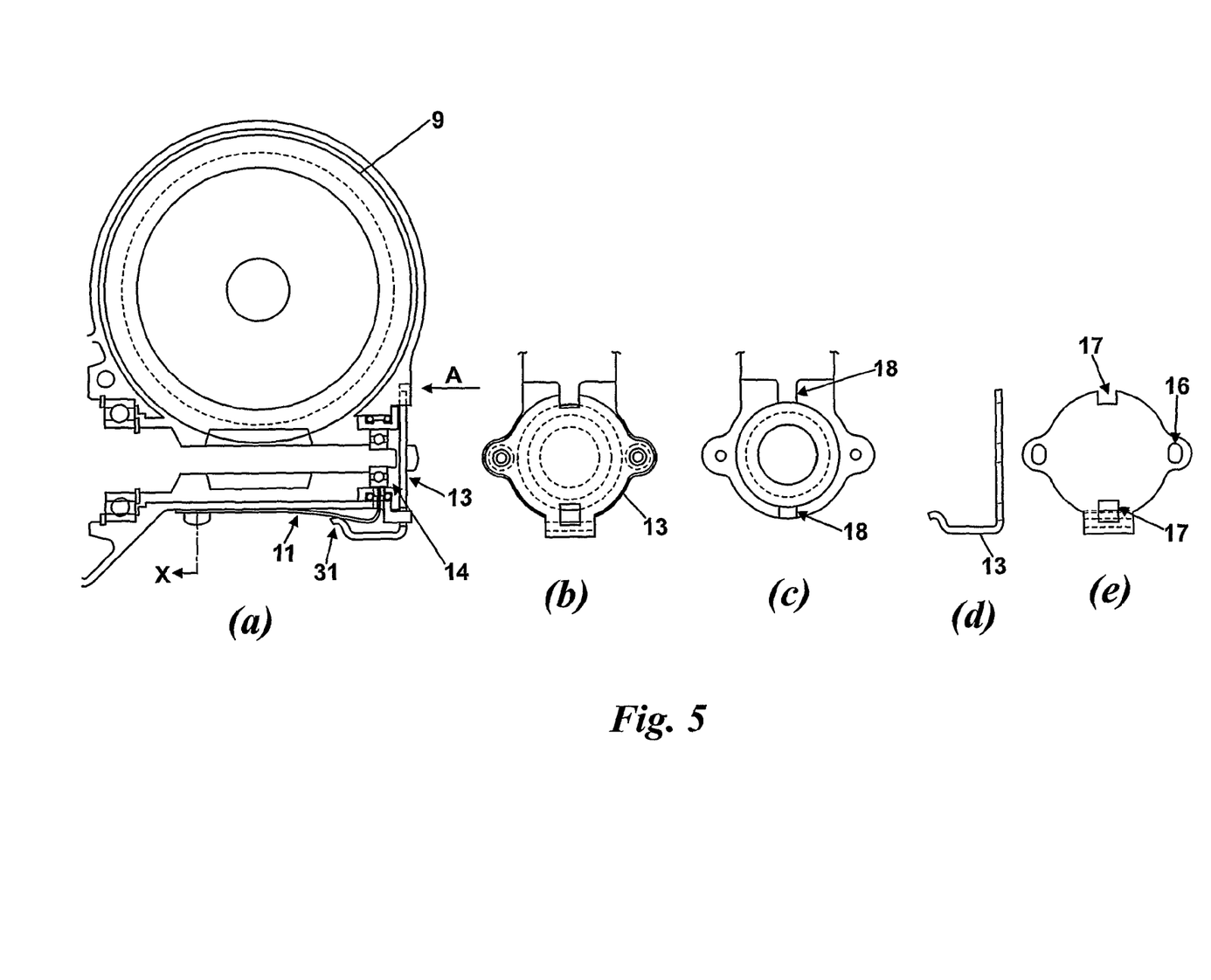

As shown in FIG. 5, an abutment 31 is incorporated into a Bearing Cover Plate 13 whose other functions include sealing the aperture 14 in the housing 4. The Plate 13 is fixed to the housing by screws 15 which pass through oval holes 16 in the Plate. These holes allow the plate to be moved a small distance (vertically in FIG. 5) either side of its nominal position, while the screws are still loose. This enables the abutment 31 to be brought into light contact with the spring 11, as described in the preceding description of the basic invention. It is envisaged that control of this process would be optimised, in a mass-production facility, by an automated method of positioning the plate relative to the spring and, almost simultaneously, temporarily clamping the plate relative to the housing by an auxiliary device so that the chosen position is not disturbed by the subsequent tightening of the screws. The plate is guided against rotation by the engagement of two accurate slots 17 in the plate with two accurately produced (e.g. by machining) up-stands 18 in the housing. The gearbox is assembled and run-in prior to the fitting of the plate 13 or, at least, prior to the plate being finally positioned and the screws 15 being tightened. The contact area of the abutment 31 may take various alternative shapes to that shown in FIG. 5a but it is desirable to avoid any form that would cause a major stress concentration in the spring 11.

Second Embodiment

Figure 6:
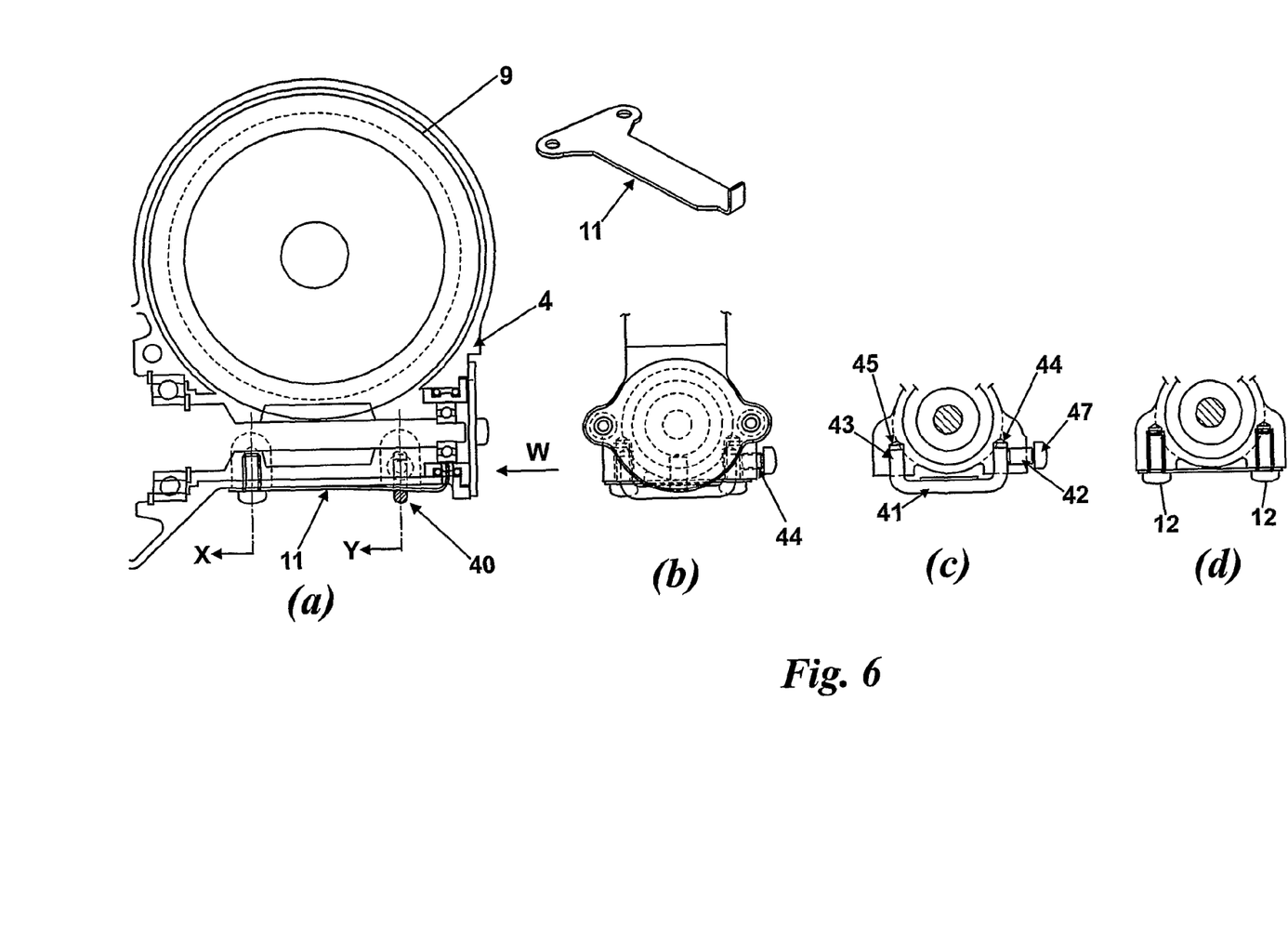
FIG. 6 is a cross sectional view similar to that of FIG. 1 of a second embodiment of a gearbox assembly in accordance with the present invention, (b) is a part view in direction W, (c) is a view of a section along the line Y and (d) is a view of a section along the line X.
Figure 7:
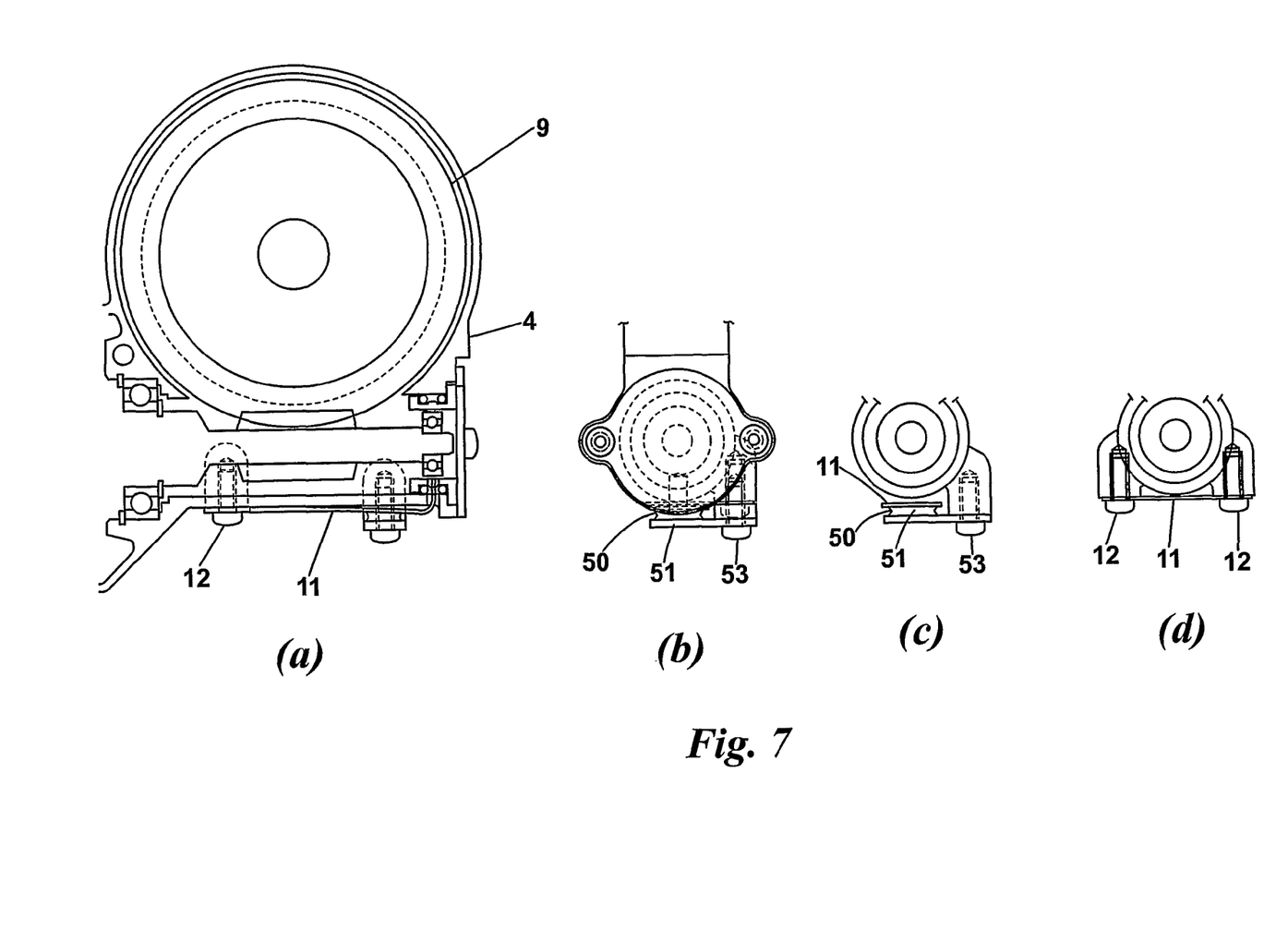
FIG. 7 is a cross sectional view similar to that of FIG. 1 of a third embodiment of a gearbox assembly in accordance with the present invention, (b) is a part view in direction W, (c) is a view of a section along the line Y and (d) is a view of a section along the line X.

In an alternative embodiment shown in FIG. 6, an alternative abutment 40 is formed by the central portion of a bent rod 41 in which legs 42, 43 are formed at right-angles to either side of the said central portion. The legs of the rod are located in parallel holes 44, 45 in the housing 4. At least one threaded hole 46 in the housing intersects at least one of the holes 44 so that a screw 47 can be inserted in said hole and used to retain the rod 41 in a fixed position relative to the housing once the said screw 47 has been tightened. The screw 47 may be a headed screw as shown in FIG. 6c or it may be a grub screw. The screw 47 may be further secured by using a lock-nut (not shown) and/or by the application of an adhesive to either the male and/or the female thread. The rod is prevented from rotating about an axis parallel to its legs by having a pair of said legs which are distal from one another and which locate in the pair of holes 44, 45 in the housing. Alternatively, one leg could be absent and the central portion could be extended away from a single leg and be located in a slot or fork in the housing. The legs are a sliding fit in the holes to allow the rod to be moved a small distance (vertically in FIG. 6) either side of its nominal position, while the screw or screws are still loose. This enables the abutment 40 to be brought into light contact with the spring 11, as described in the preceding description of the basic invention. It is envisaged that control of this process would be optimised, in a mass-production facility, by an automated method of positioning the rod relative to the spring.

The gearbox is assembled and run-in prior to the fitting of the rod or, at least, prior to the rod being finally positioned and the screw 47 being tightened Third Embodiment Referring to FIG. 7(a) to (d), an abutment 50 is formed by a deposit of a resin-like material which is dispensed in liquid form into the gap between the spring 11 and an adjacent and substantially parallel surface 51. The said surface is that of a relatively stiff part 52 which is fixed to the gearbox housing 4. For example the said part 52 could be attached to the housing 4 by at least one screw 53 which engages with at least one threaded hole 54 in the housing. Alternatively, the said surface 51 could be an extension of the housing 4 itself. The gearbox is assembled and run-in prior to the material being dispensed or at least prior to it hardening. The material 55 may be one that cures to a relatively rigid state or alternatively one that sets to a defined elasticity. In the latter case, the said defined elasticity will influence the effective rate that the spring acquires after the curing process and therefore should be taken into account when deciding the position of the abutment relative to the ends of the spring. An example of the former, rigid, type of material would be an epoxy resin. An example of the latter type of material would be a pourable urethane compound. It is envisaged that control of the process would be optimised, in a mass-production facility, by an automated method of dispensing the material.

Modified Third Embodiment

Figure 8:
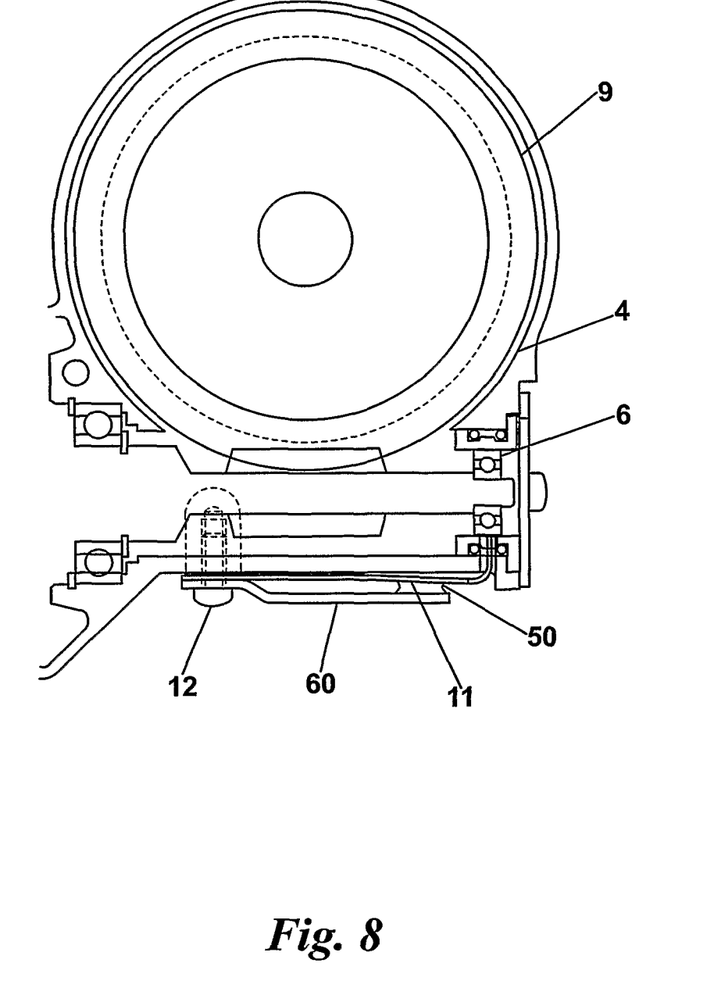
FIG. 8 is a cross sectional view of a modified form of the third embodiment.

FIG. 8 shows another version of this embodiment in which the said surface 51 is that of relatively rigid part 60 which is attached to the housing 4 by the same screws 12 that fix the spring 11 to the housing 4.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A gearbox assembly for an electric power steering apparatus comprising:
    an electric power assisted steering system comprising a housing, an electric motor fixed relative to the housing having a stator and a rotor, an input shaft operatively connected to the rotor, the input shaft supported at a first end furthest from the motor by a first bearing means and at a second end by a second bearing means, an output shaft operatively connected to a steering column which carries a wheel gear which is fixed relative to the housing and which meshes with a worm gear, and a torque sensor adapted to produce an output signal indicative of the torque in the output shaft, the motor being adapted to apply a torque to the output shaft dependent upon the output signal from the torque sensor, and in which the worm gear provided on the input shaft is adapted to mesh with a wheel gear on the output shaft, further comprising resilient biasing means adapted to act upon the first bearing means to bias the input shaft towards the wheel gear;
    in which the biasing means comprises a spring assembly which acts between the housing and the first bearing means,
    in which in a neutral position of the gearbox assembly the worm gear and wheel gear are fully engaged and the spring assembly applies a biasing force onto the first bearing means in a first direction away from the neutral position so as to ensure that the worm gear and wheel gear are fully engaged, the spring assembly also providing a resisting force against movement of the first bearing means in a second direction, opposed to the first direction, in the event that the worm gear and wheel gear try to disengage,
    wherein the spring assembly has a spring rate which has a step change about the neutral position such that the rate of change in the force exerted by the spring assembly on the first bearing means as the spring assembly moves in the first direction from the neutral position is lower than the rate of change in the force as the spring assembly moves in the second direction away from the neutral position.

2. A gearbox assembly according to claim 1 in which the rate of change in the first direction from an installation position is chosen so that over an expected range of movement in the first direction due to wear the force exerted by the spring is substantially constant.

3. A gearbox assembly according to claim 2 in which the spring assembly has a spring rate in the second direction away from the neutral position of at least double that of before the step change.

4. A gearbox assembly according to claim 1 in which the step change in spring rate that occurs upon movement of the spring assembly through the neutral position occurs at a point slightly offset in the second direction from the neutral position.

5. A gearbox assembly according to claim 1 in which a position of the step change is adjustable.

6. A gearbox assembly according to claim 1 in which the spring assembly comprises a leaf spring which has a first end fixed to the housing and a second end which has a tip that acts upon the first bearing means.

7. A gearbox assembly according to claim 6 in which an abutment is provided which functions as a fulcrum which contacts the leaf spring between the point where the leaf spring is fixed to the housing and the tip of the leaf spring whereby as the leaf spring is moved in the second direction towards and then past the neutral position the leaf spring contacts the abutment.

8. A gearbox assembly according to claim 7 in which the abutment fulcrum touches the leaf spring in the neutral position so that any movement in the second direction away from neutral is at a higher spring rate.

9. A gearbox assembly according to claim 7 in which the abutment is substantially rigid so that it does not move or deform when the leaf spring presses thereagainst.

10. A gearbox assembly according to claim 7 in which the abutment is fixed to a part of the housing.

11. A gearbox assembly according to claim 10 in which the abutment is secured to the housing by fastenings that secure also the leaf spring.

12. A gearbox assembly according to claim 7 in which the abutment comprises a part of an end cap that covers the first bearing means and the first end of the input shaft.

13. A gearbox assembly according to claim 7 in which the abutment comprises a U-shaped bar that has a central portion that straddles the leaf spring and two arms that engage holes in the housing.

14. A gearbox assembly according to claim 7 in which the position of the abutment relative to the housing and/or relative to the leaf spring is adjustable.

* * * * *